United States Patent
Chan et al.

(10) Patent No.: US 12,081,130 B2
(45) Date of Patent: Sep. 3, 2024

(54) POWER DELIVERY SOURCE DEVICE AND POWER DELIVERY SYSTEM WITH ELECTRIC ARC SUPPRESSION

(71) Applicant: ACER INCORPORATED, New Taipei (TW)

(72) Inventors: Tzu-Tseng Chan, New Taipei (TW); Chih-Chiang Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 246 days.

(21) Appl. No.: 17/886,468

(22) Filed: Aug. 12, 2022

(65) Prior Publication Data

US 2023/0327561 A1    Oct. 12, 2023

(30) Foreign Application Priority Data

Apr. 7, 2022   (TW) .................................. 111113157

(51) Int. Cl.
*H02M 3/335* (2006.01)
*H02M 1/00* (2007.01)
*H02M 1/32* (2007.01)
*H02M 1/42* (2007.01)

(52) U.S. Cl.
CPC ......... *H02M 3/33507* (2013.01); *H02M 1/32* (2013.01); *H02M 1/4266* (2013.01)

(58) Field of Classification Search
CPC ... H02M 3/33507; H02M 1/32; H02M 1/4266
See application file for complete search history.

(56) References Cited

U.S. PATENT DOCUMENTS

| | | | |
|---|---|---|---|
| 2012/0243269 A1* | 9/2012 | Ren .................... | H02M 3/33507 363/21.12 |
| 2022/0302846 A1* | 9/2022 | Liu ........................ | H02M 3/158 |
| 2023/0261508 A1* | 8/2023 | Chan ...................... | H02M 1/007 320/166 |
| 2024/0079961 A1* | 3/2024 | Chan ....................... | H02M 3/01 |

* cited by examiner

*Primary Examiner* — Sisay G Tiku
(74) *Attorney, Agent, or Firm* — Winston Hsu

(57) ABSTRACT

A power delivery system includes a PD source device and a PD sink device. The PD source device is configured to detect its connection status with the PD sink device and determine whether its power supply is high-voltage operation. When determining that the PD source device is supplying high-voltage power and detecting that the PD source device is detached from the PD sink device, the PD source device is configured to provide an oscillating rapid discharging path for its output capacitor, thereby rapidly reducing its output voltage and suppressing electrical arc.

20 Claims, 5 Drawing Sheets

FIG. 1 PRIOR ART

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | Vbus | CC1 | D+ | D- | SBU1 | Vbus | RX2- | RX2+ | GND |

| GND | RX1+ | RX1- | Vbus | SBU2 | D- | D+ | CC2 | Vbus | TX2- | TX2+ | GND |
|---|---|---|---|---|---|---|---|---|---|---|---|
| B12 | B11 | B10 | B9 | B8 | B7 | B6 | B5 | B4 | B3 | B2 | B1 |

FIG. 2 PRIOR ART

| A12 | A11 | A10 | A9 | A8 | A7 | A6 | A5 | A4 | A3 | A2 | A1 |
|---|---|---|---|---|---|---|---|---|---|---|---|
| GND | RX2+ | RX2- | Vbus | SBU1 | D- | D+ | CC | Vbus | TX1- | TX1+ | GND |

| GND | TX2+ | TX2- | Vbus | $V_{CONN}$ | | | SBU2 | Vbus | RX1- | RX1+ | GND |
|---|---|---|---|---|---|---|---|---|---|---|---|
| B1 | B2 | B3 | B4 | B5 | B6 | B7 | B8 | B9 | B10 | B11 | B12 |

POWER DELIVERY SOURCE DEVICE AND POWER DELIVERY SYSTEM WITH ELECTRIC ARC SUPPRESSION

BACKGROUND OF THE INVENTION

1. Field of the Invention

The present invention is related to a power delivery source device and a related power delivery system, and more particularly, to a power delivery source device and a related power delivery system with electrical arc suppression.

2. Description of the Prior Art

Electronic devices are often equipped with various types of interfaces, which enable power and/or data delivery between devices. One example of such interface is the Universal Serial Bus (USB) interface. USB is an industry standard developed by the USB Implementers Forum, which defines characteristics of the cables, connectors and communications protocols used in a bus for connection, communication, and power delivery (PD) between computers and electronic devices. USB Type-C connectors are currently used in various types of devices and accessories due to the ability of transmitting audio/video data at a higher rate, supporting forward/reverse insertion, and providing high charging efficiency.

FIG. 1 and FIG. 2 are diagrams illustrating a communication interface conforming to current USB Type-C specification, wherein FIG. 1 is a diagram illustrating the pin layout of a USB Type-C plug and FIG. 2 is a diagram illustrating the pin layout of a USB Type-C socket. In order to support forward/reverse insertion, each of the USB Type-C plug and the USB Type-C socket includes a set of pins with symmetrical orientation and designated by A1-A12 and B1-B12. The configuration channel pins CC1/CC2 are used to detect the orientation of insertion, the connection status, determine downstream facing port (DFP) and upstream facing port (UFP), configure the power supply pins Vbus and Vconn, configure alternate or accessory mode, and execute procedures related to PD communications. When it is determined that a connection has been established based on the configuration channel pins CC1/CC2, power may be supplied via the power supply pin Vbus of a power source.

Simply speaking, PD protocol is a fast-charging standard. A current PD system normally includes a PD source device and a PD sink device, wherein PD connection may be established between the PD source device and the PD sink device via USB Type-C connectors.

FIG. 3 is a diagram illustrating the voltage level and the connection status of the power supply pins Vbus in a current PD system. The vertical axis represents voltage level, and the horizontal axis represents time. V1 represents the voltage level of the power supply pin Vbus in the PD source device of the current PD system, and V2 represents the voltage level of the power supply pin Vbus in the PD sink device of the current PD system. When the PD source device normally supplies power to the PD sink device before T1, V1=V2. When the PD source device is detached from the PD sink device at T1, the voltage level V1 may be maintained by the storage device in the PD source device within a period of time. However, since there is no storage device in the PD sink device, the voltage level V2 rapidly drops after the PD source device is detached from the PD sink device. According to USB Type-C specifications related to power delivery, electrical arc is very likely to be induced when the voltage difference between the power supply pin Vbus of the PD source device and the power supply pin Vbus of the PD sink device (V1-V2) exceeds 12V, which raises safety concerns. Therefore, there is a need for a PD system with electrical arc suppression.

SUMMARY OF THE INVENTION

The present invention provides a PD source device which suppresses electrical arc and includes a first power supply pin for supplying power to a second power supply pin of a PD sink device, a first configuration channel pin for receiving a pull-down voltage from the PD sink device when the first configuration channel pin is coupled to a second configuration channel pin of the PD sink device, a boost PFC circuit, an active clamp flyback converting circuit and an output voltage communication circuit. The boost PFC circuit is configured to covert an AC voltage supplied by mains electricity to a first pulsed DC voltage, and includes a first output capacitor for storing energy of the first pulsed DC voltage and a first power switch having a first end coupled to a first end of the first output capacitor, a second end coupled to a second end of the first output capacitor and a control end for receiving a first control signal. The active clamp flyback converting circuit is configured to covert the first pulsed DC voltage to a second pulsed DC voltage, and includes a transformer, a clamp voltage capacitor, a second power switch, an active clamp switch, and a second output capacitor. The transformer is configured to transfer the energy of the first pulsed DC voltage from a primary side to a secondary side for supplying the second pulsed DC voltage, and includes a primary winding disposed on the primary side and including a first dotted terminal and a first undotted terminal, a secondary winding disposed on the secondary side and including a second dotted terminal and a second undotted terminal, and a discharge winding for providing a discharge inductor. The clamp voltage capacitor includes a first end coupled to the boost PFC circuit for receiving the first pulsed DC voltage, and a second end coupled to a first end of the discharge inductor. The second power switch includes a first end coupled to the first undotted terminal, a second end coupled to a ground level and a control end for receiving a second control signal. The active clamp switch includes a first end coupled to the first undotted terminal, a second end coupled to the first end of the discharge inductor and a control end for receiving a third control signal. The second output capacitor stores energy of the second pulsed DC voltage and includes a first end coupled to the first power supply pin and a second end coupled to a ground pin. The output voltage communication circuit is configured to selectively couple a second end of the discharge inductor to the first power supply pin according to a voltage level of the first power supply pin and a voltage level of the first configuration channel pin.

The present invention provides a PD system which suppresses electrical arc and includes a PD source device and a PD sink device. The PD source device includes a first power supply pin for supplying power, a first configuration channel pin for receiving a pull-down voltage, a boost PFC circuit, an active clamp flyback converting circuit and an output voltage communication circuit. The boost PFC circuit is configured to covert an AC voltage supplied by mains electricity to a first pulsed DC voltage, and includes a first output capacitor for storing energy of the first pulsed DC voltage and a first power switch having a first end coupled to a first end of the first output capacitor, a second end coupled to a second end of the first output capacitor and a control end for receiving a first control signal. The active clamp flyback converting circuit is configured to covert the first pulsed DC voltage to a second pulsed DC voltage, and includes a transformer, a clamp voltage capacitor, a second power switch, an active clamp switch, and a second output capacitor. The transformer is configured to transfer the energy of the first pulsed DC voltage from a primary side to a secondary side for supplying the second pulsed DC voltage, and includes a primary winding disposed on the primary side and including a first dotted terminal and a first undotted terminal, a secondary winding disposed on the secondary side and including a second dotted terminal and a second undotted terminal, and a discharge winding for providing a discharge inductor. The clamp voltage capacitor includes a first end coupled to the boost PFC circuit for receiving the first pulsed DC voltage, and a second end coupled to a first end of the discharge inductor. The second power switch includes a first end coupled to the first undotted terminal, a second end coupled to a ground level and a control end for receiving a second control signal. The active clamp switch includes a first end coupled to the first undotted terminal, a second end coupled to the first end of the discharge inductor and a control end for receiving a third control signal. The second output capacitor stores energy of the second pulsed DC voltage and includes a first end coupled to the first power supply pin and a second end coupled to a ground pin. The output voltage communication circuit is configured to selectively couple a second end of the discharge inductor to the first power supply pin according to a voltage level of the first power supply pin and a voltage level of the first configuration channel pin. The PD sink device includes a second power supply pin for receiving the power supplied from the first power supply pin of the PD source device, and a second configuration channel pin for outputting the pull-down voltage when the first configuration channel pin of the PD source device is coupled to the second configuration channel pin of the PD sink device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 and FIG. 2 are diagrams illustrating a communication interface conforming to current USB Type-C specification.

DETAILED DESCRIPTION

Figure 3:
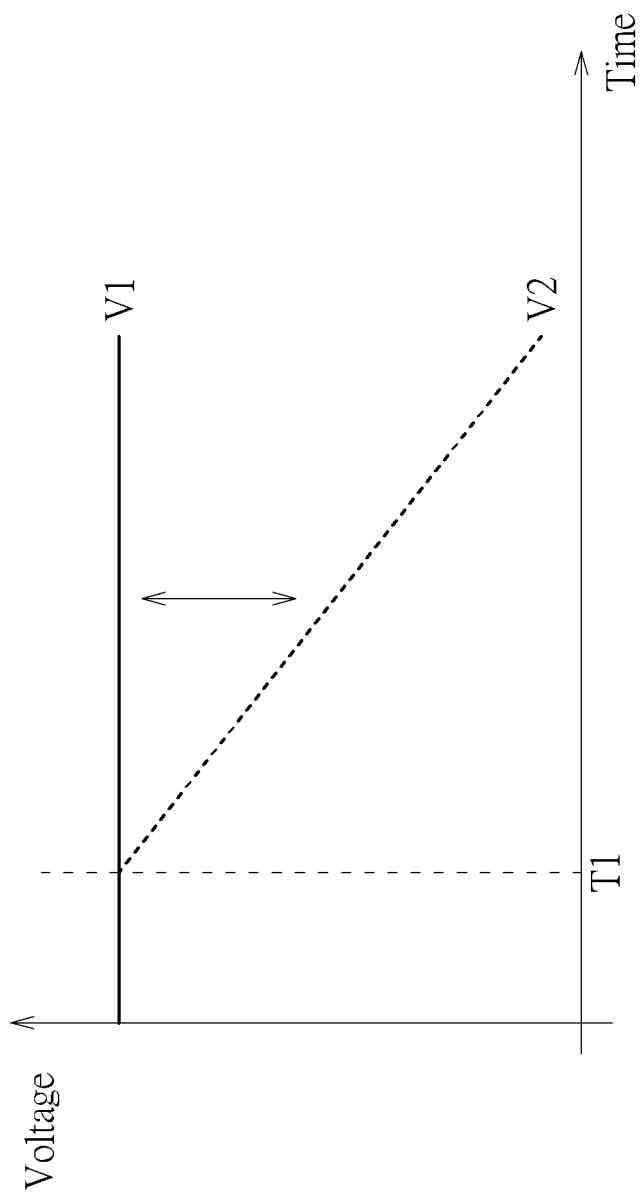
FIG. 3 is a diagram illustrating the voltage level and the connection status of the power supply pins Vbus in a current PD system.
Figure 4:
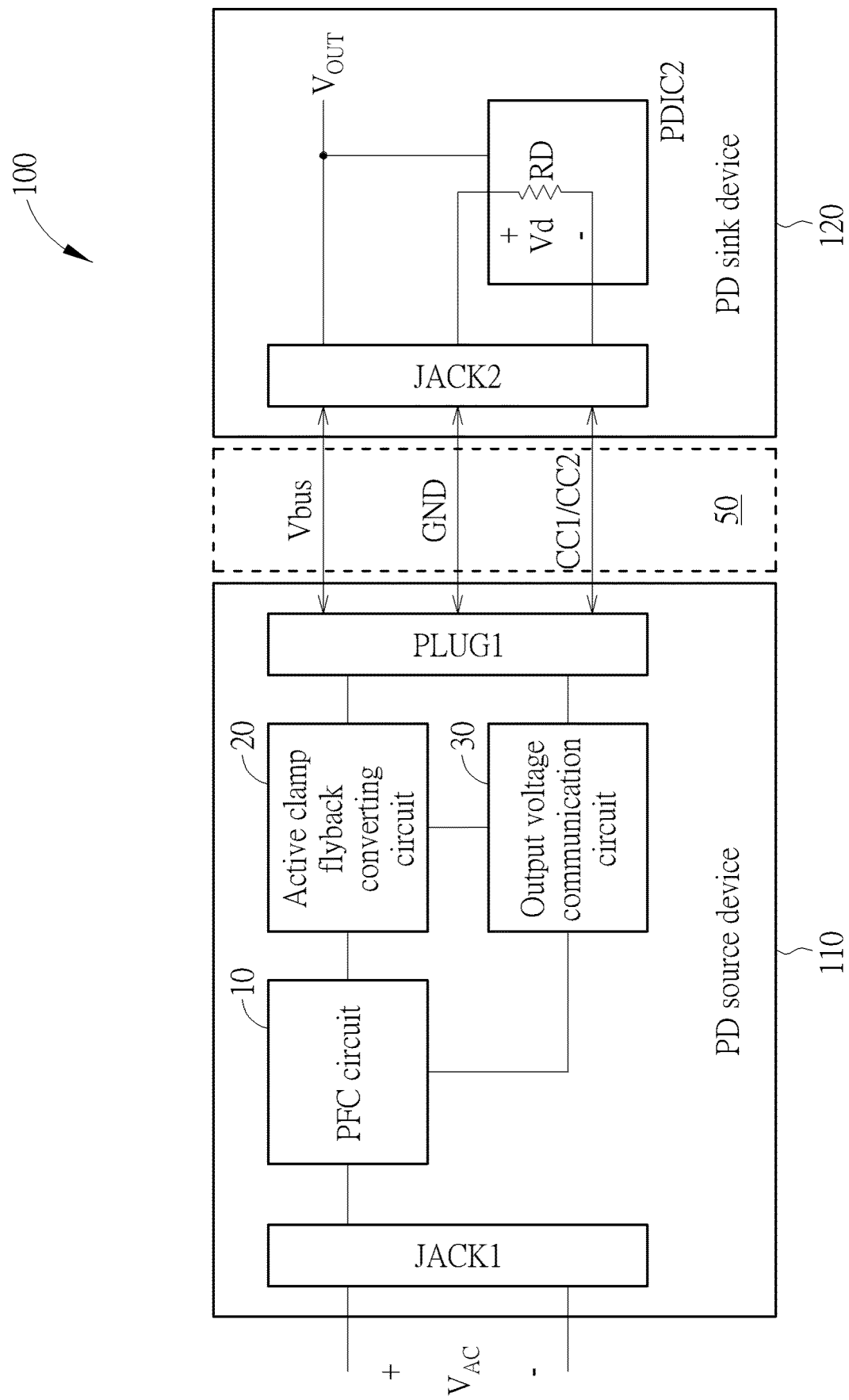
FIG. 4 is a functional diagram illustrating a PD system according to an embodiment of the present invention.

FIG. 4 is a functional diagram illustrating a PD system 100 according to an embodiment of the present invention. The PD system 100 includes a PD source device 110 and a PD sink device 120. The PD source device 110 includes a connector JACK1, a connector PLUG1, a boost power factor correction (PFC) circuit 10, an active clamp flyback converting circuit 20, and an output voltage communication circuit 30. The PD sink device includes a connector JACK2 and a PD integrated circuit PDIC2, wherein the PD integrated circuit PDIC2 includes a pull-down resistor RD.

The PD source device 110 may be connected to mains electricity via the connector JACK1 at its input end and connected to the connector JACK2 of the PD sink device 120 via the connector PLUG1 at its output end. The connector PLUG1 of the PD source device 110 may be connected to the connector JACK2 of the PD sink device 120 via a USB Type-C interface 50, wherein the pin layout of the connectors PLUG1 and JACk2 may be arranged in the same manner as depicted in FIGS. 1 and 2. For simplicity, FIG. 4 only depicts the power supply pin Vbus, the configuration channel pins CC1/CC2 and the ground pin GND which are associated with the operation of the present invention.

The PD source device 110 is configured to convert an alternative-current (AC) voltage $V_{AC}$ supplied by mains electricity into an output voltage $V_{OUT}$ for providing the power required by the operation of the PD sink device 120. The PD sink device 120 may receive power or instructions from the PD source device 110 via the connector JACK2 at its input end. The PD integrated circuit PDIC2 is configured to monitor the status of the output voltage $V_{OUT}$ and then communicate with the PD source device 110 via the USB Type-C interface 50 in order to maintain normal power supply operation.

Figure 5:
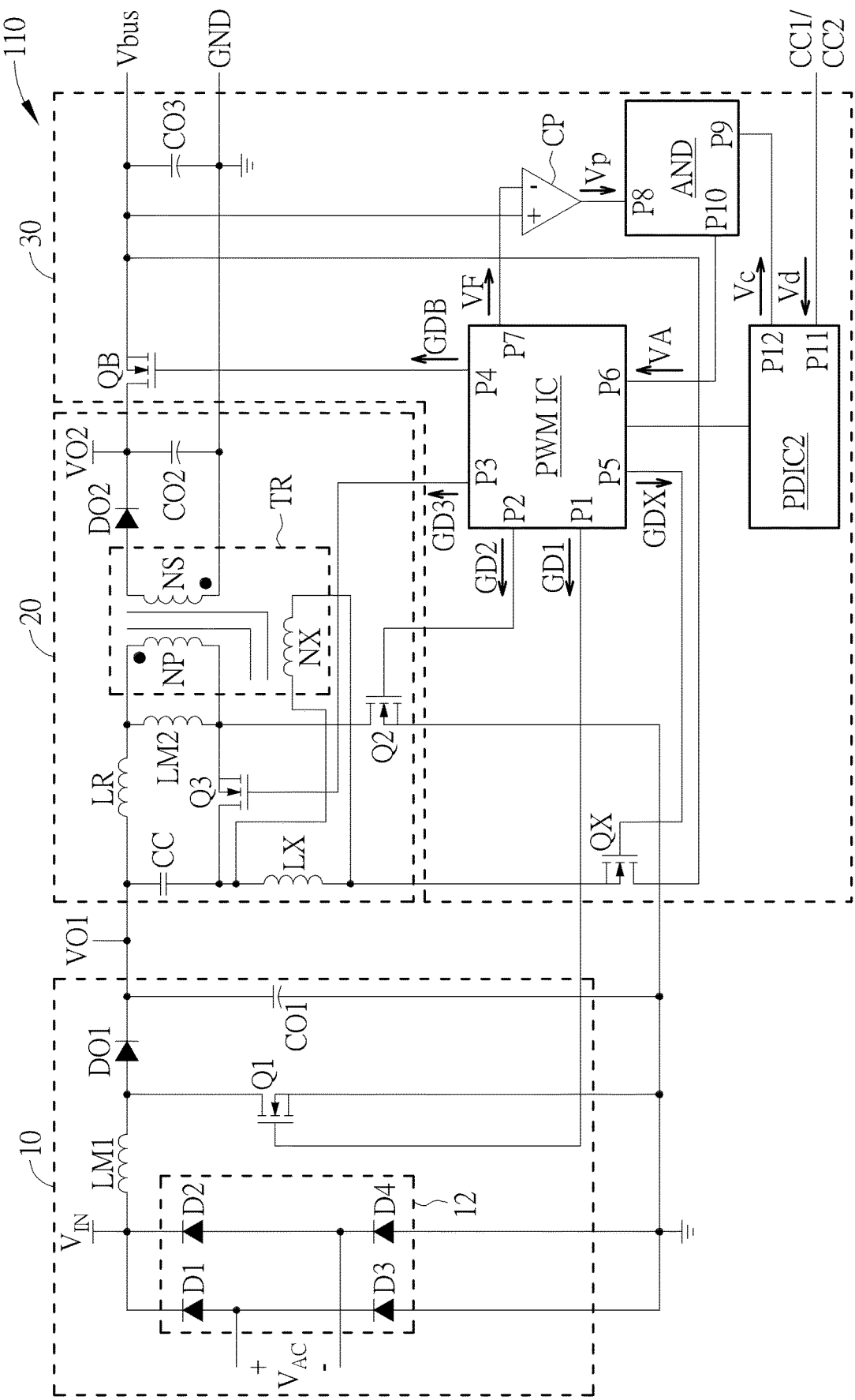
FIG. 5 is a diagram illustrating an implementation of the PD source device in the PD system according to an embodiment of the present invention.

FIG. 5 is a diagram illustrating an implementation of the PD source device 110 in the PD system 100 according to an embodiment of the present invention. The boost PFC circuit 10 of the PD source device 110 includes a rectifier 12, a power switch Q1, an output diode DO1, an output capacitor CO1 and a boost inductor LM1. The boost PFC circuit 10 is configured to provide a pulsed DC voltage VO1 according to the AC voltage $V_{AC}$ supplied by mains electricity. In an embodiment, the rectifier 12 may be a bridge rectifier which includes rectifying diodes D1-D4 for converting the AC voltage $V_{AC}$ supplied by mains electricity into a DC voltage $V_{IN}$. However, the implementation of the rectifier 12 does not limit the scope of the present invention.

The boost inductor LM1 includes a first end coupled to the rectifier 12 for receiving the DC voltage $V_{IN}$ and a second end coupled to the anode of the output diode DO1 for storing the energy of the DC voltage $V_{IN}$. The output capacitor CO1 includes a first end coupled to the cathode of the output diode DO1 and a second end coupled to a ground level for storing the energy of the DC voltage $V_{IN}$, thereby providing the pulsed DC voltage VO1. The power switch Q1 includes a first end coupled to the anode of the output diode DO1, a second end coupled to the ground level, and a control end for receiving a control signal GD1. As the power switch Q1 performs high-frequency switching based on the control signal GD1, the boost inductor LM1 may be charged or discharged accordingly so that the input current may follow the input voltage, thereby improving power factor and reducing current harmonic waves.

The active clamp flyback circuit 20 of the PD source device 110 includes a transformer TR, a power switch Q2, an active clamp switch Q3, a leakage inductor LR, a magnetizing inductor LM2, a clamp voltage capacitor CC, an output capacitor CO2, and an output diode DO2. The active clamp flyback circuit 20 is configured to receive the pulsed DC voltage VO1 at its input end and provide the pulsed DC voltage VO2 at its output end.

The transformer TR includes a primary winding (represented by its number of turns NP), a secondary winding (represented by its number of turns NS) and a discharge winding (represented by its number of turns NX). The leakage inductor LR includes a first end coupled to the boost PFC circuit 10 and a second end coupled to the dotted terminal of the primary winding NP in the transformer TR. The magnetizing inductor LM2 includes a first end coupled to the dotted terminal of the primary winding NP in the transformer TR and a second end coupled to the undotted terminal of the primary winding NP in the transformer TR. The discharge winding NX may provide a discharge inductor LX. The clamp capacitor CC includes a first end coupled to the pulsed DC voltage VO1 and a second end coupled to the first end of the discharge inductor LX. The power switch Q2 includes a first end coupled to the undotted terminal of the primary winding NP in the transformer TR, a second end coupled to the ground level, and a control end for receiving a control signal GD2. The active clamp switch Q3 includes a first end coupled to the undotted terminal of the primary winding NP in the transformer TR, a second end coupled to the first end of the discharge inductor LX, and a control end for receiving a control GD3. The output diode DO2 includes an anode coupled to the undotted terminal of the secondary winding NS in the transformer TR, and a cathode coupled to the output end of the active clamp flyback circuit 20. The output capacitor CO2 includes a first end coupled to the cathode of the output diode DO2, and a second end coupled to the dotted terminal of the secondary winding NS in the transformer TR.

The pulsed DC voltage VO1 outputted by the boost PFC circuit 10 is the input voltage of the active clamp flyback circuit 20, and may be transmitted to the dotted terminal of the primary winding NP in the transformer TR via the leakage inductor LX. The transformer TR is configured to transfer the energy associated with the pulsed DC voltage VO1 from the primary winding NP to the secondary winding NS, and the output capacitor CO2 may store the energy of the secondary winding NS for providing the pulsed DC voltage VO2. Base on Faraday's law of induction, the operation of the transformer TR may be described by an equation of $V_{NP}/V_{NS}$=NP/NS, wherein $V_{NP}$ represents the voltage established across the primary winding NP, $V_{NS}$ represents the voltage established across the secondary winding NS, and the number of turns in the secondary winding NS is larger than the number of turns in the primary winding NP in step-up applications.

During the operation of the active clamp flyback circuit 20, the power switch Q2 and the active clamp switch Q3 operate in a complimentary manner. More specifically, the control signals GD2 and GD3 have opposite phases at any time so that only one of the power switch Q2 and the active clamp switch Q3 is turned on at the same time. The output diode DO2 and the active clamp switch Q3 operate in a synchronized manner, wherein both the output diode DO2 and the active clamp switch Q3 are turned on or turned off simultaneously. When the power switch Q2 is turned on, the active clamp switch Q3 and the output diode DO2 are turned off, and the leakage inductor LR and the magnetizing inductor LM2 may store the energy associated with the pulsed DC voltage VO1. When the power switch Q2 is turned off, the active clamp switch Q3 and the output diode DO2 are turned on, and the energy stored in the leakage inductor LR and the magnetizing inductor LM2 may be absorbed by the clamp voltage capacitor CC, thereby preventing the parasite capacitance of the leakage inductor LR and the magnetizing inductor LM2 from causing high-frequency resonation loss. The energy stored in the magnetizing inductor LM2 may be transferred from the primary winding NP to the secondary winding NS, and then stored in the output capacitor CO2.

The output voltage communication circuit 30 of the PD source device 110 includes a pulse width modulation integrated circuit PWMIC, a comparator CP, an isolation switch QB, a logic circuit AND, a discharge switch QX, an output capacitor Co3, and a PD integrated circuit PDIC1. The pulse width modulation integrated circuit PWMIC includes 7 pins P1-P7, wherein the pin P1 is used to output the control signal GD1 to the control end of the power switch Q1, the pin P2 is used to output the control signal GD2 to the control end of the power switch Q2, the pin P3 is used to output the control signal GD3 to the control end of the active clamp switch Q3, the pin P4 is used to output a control signal GDB to the control end of the isolation switch QB, the pin P5 is used to output a control signal GDX to the control end of the discharge switch QX, the pin P6 is used to receive a discharge control signal VA, and the pin P7 is used to output a reference voltage VF.

The isolation switch QB includes a first end coupled to the active clamp flyback converting circuit 20 for receiving the pulsed DC voltage VO2, a second end coupled to the power supply pin Vbus of the connector PLUG1, and a control end coupled to the pin P4 of the pulse width modulation integrated circuit PWMIC for receiving the control signal GDB. The discharge switch QX includes a first end coupled to the second end of the discharge inductor LX, a second end coupled to the power supply pin Vbus of the connector PLUG1, and a control end coupled to the pin P5 of the pulse width modulation integrated circuit PWMIC for receiving the control signal GDX. The output capacitor CO3 is coupled between the power supply pin Vbus and the ground pin GND of the connector PLUG1.

The comparator CP includes a positive input end coupled to the power supply pin Vbus of the connector PLUG1, a negative input end coupled to the pin P7 of the pulse width modulation integrated circuit PWMIC for receiving the reference voltage VF, and an output end for outputting a comparison signal Vp to the logic circuit AND. The comparator CP is configured to provide the comparison signal Vp according to the voltages established on its positive input end and negative input end. When the voltage level of the power supply pin Vbus of the connector PLUG1 is higher than the reference voltage VF, the comparator CP is configured to output the comparison signal Vp having a first voltage level (such as a high voltage level). When the voltage level of the power supply pin Vbus of the connector PLUG1 is not higher than the reference voltage VF, the comparator CP is configured to output the comparison signal Vp having a second voltage level (such as a low voltage level).

The logic circuit AND includes pins P8-P10, wherein the first input pin P8 is coupled to the output end of the comparator CP for receiving the comparison signal Vp, the second input end P9 is coupled to the output end of the PD integrated circuit PDIC1 for receiving a connection signal Vc, and the output pin P10 is for outputting the discharge control signal VA to the pin P6 of the pulse width modulation integrated circuit PWMIC. In an embodiment, the logic circuit AND may be an AND gate. When the comparison signal Vp received by the first input pin P8 and the connection signal Vc received by the second input end P9 are both at the high voltage level, the logic circuit AND is configured to output the discharge control signal VA having a high voltage level. When the comparison signal Vp received by the first input pin P8 and the connection signal Vc received by the second input end P9 are not both at the high voltage level, the logic circuit AND is configured to output the discharge control signal VA having a low voltage level.

The PD integrated circuit PDIC1 includes pins P11-P12, wherein the input pin P11 is coupled to the configuration channel pins CC1/CC2 of the connector PLUG1 and the output pin P12 is coupled to the second input end P9 of the logic circuit AND. As depicted in FIG. 4, when the PD source device 110 is attached to the PD sink device 120, the configuration channel pins CC1/CC2 of the connector PLUG1 are connected to the configuration channel pins CC1/CC2 of the connector JACK2, and the constant voltage provided by the PD source device 110 establishes a pull-down voltage Vd across the pull-down resistor Rd of the PD sink device 120. When detecting the pull-down voltage Vd on the input pin P11, the PD integrated circuit PDIC1 is configured to instruct the pulse width modulation circuit PWMIC to provide the control signal GDB having an enable level on its pin P4, thereby turning on the isolation switch QB. Under such circumstance, the pulsed DC voltage VO2 may be transmitted to the output capacitor CO3 and stored therein, thereby supplying power from the power supply pin Vbus of the connector PLUG1 to the power supply pin Vbus of the connector JACK2. Next, PD communications may be performed via the configuration channel pins CC1/CC2 of the connector PLUG1 and the configuration channel pins CC1/CC2 of the connector JACK2, so that the PD source device 110 may raise the voltage level of the power supply pin Vbus of the connector PLUG1 to the voltage level required by the operation of the PD sink device 120.

When the PD source device 110 is detached from the PD sink device 120, the configuration channel pins CC1/CC2 of the connector PLUG1 are isolated from the configuration channel pins CC1/CC2 of the connector JACK2, and the PD source device 110 does not have any output (the power supply pin Vbus of the connector PLUG1 is at 0V). When unable to detect any pull-down voltage Vd on the input pin P11, the PD integrated circuit PDIC2 is configured to output the connection signal Vc having a first voltage level (such as a high-level positive saturation voltage) to the second input pin P9 of the logic circuit AND and instruct the pulse width modulation circuit PWMIC to provide the control signal GDB having a disable level on its pin P4, thereby turning off the isolation switch QB.

As previously stated, after the PD source device 110 is detached from the PD sink device 120, the voltage level of the power supply pin Vbus of the connector PLUG1 may be maintained by the input capacitor CO3 of the PD source device 110 within a period of time, while the voltage level of the power supply pin Vbus of the connector JACKs drops rapidly. According to USB Type-C specifications related to power delivery, electrical arc is very likely to be induced when the voltage difference between the power supply pin Vbus of the PD source device 110 and the power supply pin Vbus of the PD sink device 120 exceeds 12V. Therefore, in an embodiment of the present invention, the reference voltage VF may be set to 12V, but not limited thereto.

In the present invention, the comparison voltage Vp provided by the comparator CP can reflect the high-voltage operation of the PD source device 110, and the connection voltage Vc provided by the PD integrated circuit PDIC2 can reflect the connectivity between the PD source device 110 and the PD sink device 120. During normal PD operation when the PD source device 110 is attached to the PD sink device 120, the power supply pin Vbus of the PD source device 110 and the power supply pin Vbus of the PD sink device 120 have the same voltage level (zero voltage difference), and there is no risk of inducing electrical arc. After the PD source device 110 is detached from the PD sink device 120, there is low possibility for the voltage difference between the power supply pin Vbus of the PD source device 110 and the power supply pin Vbus of the PD sink device 120 to induce electrical arc when the PD source device 110 does not supply power in a high-voltage operation. More specifically, when the logic circuit AND determines that the condition of "the PD source device 110 supplies power in a high-voltage operation" and the condition of "the PD source device 110 is detached from the PD sink device 120" do not hold simultaneously based the comparison voltage Vp and the connection voltage Vc, the logic circuit AND is configured to output the discharge signal VA for instructing the pulse width modulation circuit PWMIC to provide the control signal GDX having the disable level, thereby turning off the discharge switch QX.

When the logic circuit AND determines that the condition of "the PD source device 110 supplies power in a high-voltage operation" and the condition of "the PD source device 110 is detached from the PD sink device 120" hold simultaneously based the comparison voltage Vp and the connection voltage Vc, the logic circuit AND is configured to output the discharge signal VA for instructing the pulse width modulation circuit PWMIC to provide the control signal GDX having the enable level, thereby turning on the discharge switch QX. Under such circumstance, the second end of the discharge inductor LX may be coupled to the power supply pin Vbus of the connector PLUG1.

Figure 6:
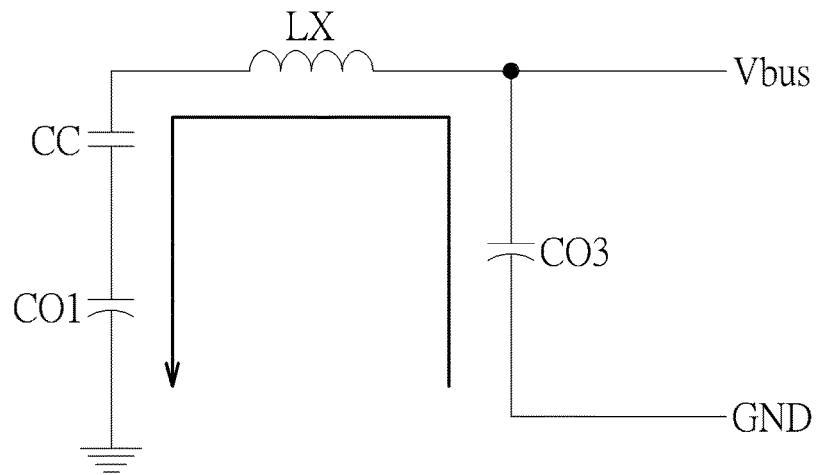
FIG. 6 is a diagram illustrating a rapid oscillating discharge path provided by the PD system according to an embodiment of the present invention.

FIG. 6 is a diagram illustrating a rapid oscillating discharge path provided by the PD system 100 according to an embodiment of the present invention. As previously stated, the discharged switch QX is turned on by the control signal GDX when the PD integrated circuit PDIC2 detects the pull-down voltage Vd (indicating that the PD source device 110 is attached to the PD sink device 120) and when the comparator CP determines that the power supply pin Vbus of the connector PLUG1 is larger than the reference voltage VF (indicating that the PD source device 110 supplies power in a high-voltage operation and its detachment may induce electrical arc). When the discharged switch QX is turned on by the control signal GDX, the output capacitor CO3, the discharge inductor LX, the clamp voltage capacitor CC and the output capacitor CO1 form the rapid oscillating discharge path as depicted in FIG. 6. The energy stored in the output capacitor CO3 may thus be discharged to the ground voltage sequentially via the discharge inductor LX, the clamp voltage capacitor CC and the output capacitor CO1, as depicted by the arrow in FIG. 6. This way, the voltage difference between the power supply pin Vbus of the PD source device 110 and the power supply pin Vbus of the PD sink device 120 may be reduced at the moment when the PD source device 110 is detached from the PD sink device 120, thereby reducing electrical arc.

Figure 7:
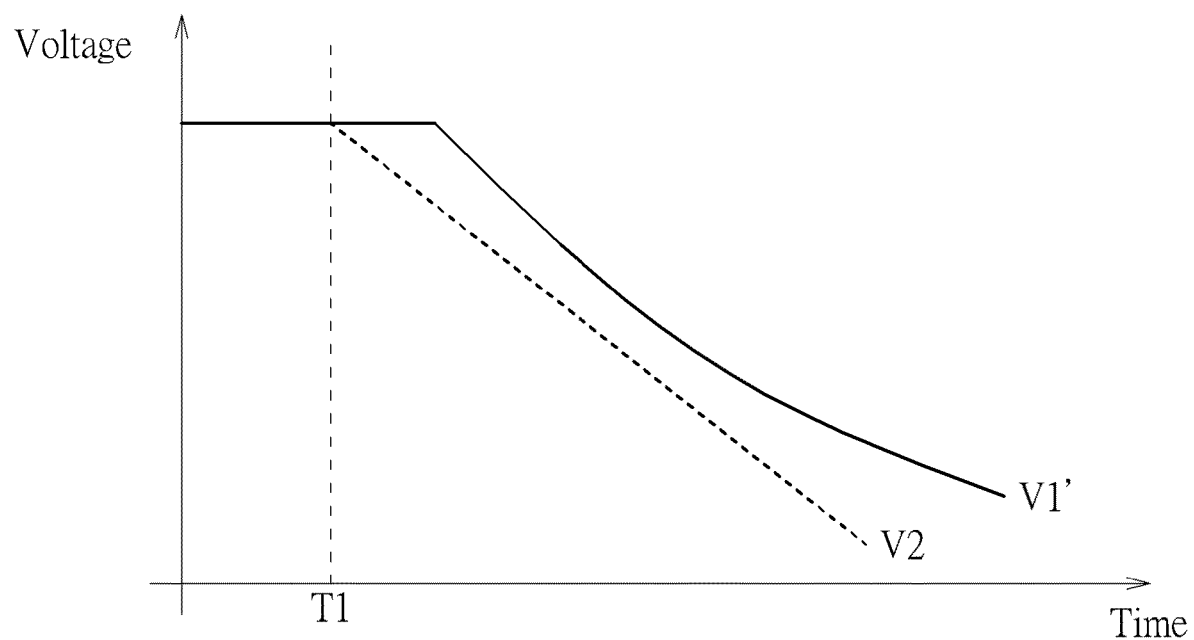
FIG. 7 is a diagram illustrating the voltage level and the connection status of the power supply pin Vbus in the PD system 100 according to an embodiment of the present invention.

FIG. 7 is a diagram illustrating the voltage level and the connection status of the power supply pin Vbus in the PD system 100 according to an embodiment of the present invention. The vertical axis represents voltage, the horizontal axis represents time, V1' represents the voltage level of the power supply pin Vbus in the PD source device 110, and V2 represents the voltage level of the power supply pin Vbus in the PD sink device 120. When the PD source device 110 normally supplies power to the PD sink device 120 before T1, V1'=V2. When the PD source device 110 is detached from the PD sink device 120 at T1, the rapid oscillating discharge path formed by the output capacitor CO3, the discharge inductor LX, the clamp voltage capacitor CC and the output capacitor CO1 allows the energy stored in the output capacitor CO3 to be rapidly discharged to the ground voltage, thereby reducing electrical arc.

In an embodiment of the present invention, each of the power switches Q1-Q2, the active clamp switch Q3, the discharge switch QX and the isolation switch QB may be a metal-oxide-semiconductor field-effect transistor (MOSFET), a bipolar junction transistor (BJT) or another device with similar function. For N-type transistors, the enable level is high voltage level, and the disable level is low voltage level; for P-type transistors, the enable level is low voltage level, and the disable level is high voltage level. However, the types of the above-mentioned switches do not limit the scope of the present invention.

In conclusion, the present PD system can detect the connection status of the PD source device and the PD sink device and determine whether the PD source device supplies power in a high-voltage operation. When determining that the PD source device supplies power in the high-voltage operation, a rapid oscillating discharge path is provided for reducing the output voltage of the PD source device upon detecting the detachment of the PD source device from the PD sink device, thereby suppressing electrical arc.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power delivery (PD) source device with electrical arc suppression, comprising: a first power supply pin for supplying power to a second power supply pin of a PD sink device; a first configuration channel pin for receiving a pull-down voltage from the PD sink device when the first configuration channel pin is coupled to a second configuration channel pin of the PD sink device; a boost power factor correction (PFC) circuit configured to covert an alternative-current (AC) voltage supplied by mains electricity to a first pulsed direct-current (DC) voltage, and comprising: a first output capacitor for storing energy of the first pulsed DC voltage; and a first power switch, comprising: a first end coupled to a first end of the first output capacitor through an output diode; a second end coupled to a second end of the first output capacitor; and a control end for receiving a first control signal; an active clamp flyback converting circuit configured to covert the first pulsed DC voltage to a second pulsed DC voltage, and comprising: a transformer configured to transfer the energy of the first pulsed DC voltage from a primary side to a secondary side for supplying the second pulsed DC voltage, and comprising: a primary winding disposed on the primary side and including a first dotted terminal and a first undotted terminal; a secondary winding disposed on the secondary side and including a second dotted terminal and a second undotted terminal; and a discharge winding for providing a discharge inductor; a clamp voltage capacitor, including: a first end coupled to the boost PFC circuit for receiving the first pulsed DC voltage; and a second end coupled to a first end of the discharge inductor; a second power switch, including: a first end coupled to the first undotted terminal; a second end coupled to a ground level; a control end for receiving a second control signal; an active clamp switch, including: a first end coupled to the first undotted terminal; a second end coupled to the first end of the discharge inductor; and a control end for receiving a third control signal; and a second output capacitor for storing energy of the second pulsed DC voltage and including: a first end coupled to the first power supply pin; and a second end coupled to a ground pin; and an output voltage communication circuit configured to selectively couple a second end of the discharge inductor to the first power supply pin according to a voltage level of the first power supply pin and a voltage level of the first configuration channel pin.

2. The PD source device of claim 1, wherein the output voltage communication circuit is configured to couple the second end of the discharge inductor to the first power supply pin when the voltage level of the first power supply pin is higher than a reference voltage and a value of the pull-down voltage is not within a predetermined range, thereby discharging the energy stored in the second output capacitor to the ground level sequentially via the discharge inductor, the clamp voltage capacitor and the first output capacitor.

3. The PD source device of claim 1, wherein the active clamp flyback converting circuit further comprises:
a leakage inductor, including:
a first end coupled to the first end of the clamp voltage capacitor; and
a second end coupled to the first dotted terminal; and
a magnetizing inductor, including:
a first end coupled to the first dotted terminal; and
a second end coupled to the first undotted terminal.

4. The PD source device of claim 1, wherein:
the active clamp flyback converting circuit further comprises an output diode which includes:
an anode coupled to the second undotted terminal of the secondary winding in the transformer; and
a cathode; and
the second output capacitor includes:
a first end coupled to the cathode of the output diode; and
a second end coupled to the second dotted terminal of the secondary winding in the transformer.

5. The PD source device of claim 1, wherein the output voltage communication circuit comprises:
a pulse width modulation integrated circuit, including:
a first pin for outputting the first control signal;
a second pin for outputting the second control signal;
a third pin for outputting the third control signal;
a fourth pin for outputting a fourth control signal;
a fifth pin for outputting a fifth control signal;
a sixth pin for receiving a discharge control signal; and
a seventh pin for receiving a reference voltage;
a comparator, including:
a positive input end coupled to the first power supply pin;
a negative input end coupled to the seventh pin of the pulse width modulation integrated circuit for receiving the reference voltage; and
an output end for outputting a comparison signal;
a PD integrated circuit, including:
an input end coupled to the first configuration channel pin; and
an output end for outputting a connection signal;
a logic circuit, including:
a first input end coupled to the output end of the comparator for receiving the comparison signal;
a second input end coupled to the output end of the PD integrated circuit for receiving the connection signal; and an output end for outputting the discharge control signal to the sixth pin of the pulse width modulation integrated circuit; and a discharge switch, including:
a first end coupled to the second end of the discharge inductor;
a second end coupled to the first power supply pin; and
a control end coupled to the fifth pin of the pulse width modulation integrated circuit for receiving the fifth control signal.

6. The PD source device of claim 5, wherein:
the comparator is configured to output the comparison signal having a first voltage level when the voltage level of the first power supply pin is higher than the reference voltage;
the comparator is configured to output the comparison signal having a second voltage level when the voltage level of the first configuration channel pin is not higher than the reference voltage;
the PD integrated circuit is configured to output the connection signal having a third voltage level when a value of the pull-down voltage received from the first configuration channel pin is not within a predetermined range;
the PD integrated circuit is configured to output the connection signal having a fourth voltage level when the value of the pull-down voltage received from the first configuration channel pin is within the predetermined range;
the logic circuit is configured to output the discharge control signal having a fifth voltage level when the first input end of the logic circuit receives the comparison signal having the first voltage level and the second input end of the logic circuit receives the connection signal having the third voltage level;
the pulse width modulation integrated circuit is configured to output the fifth control signal having an enable level for turning on the discharge switch when the sixth pin of the pulse width modulation integrated circuit receives the discharge control signal having the fifth voltage level;
the first voltage level is different from the second voltage level; and
the third voltage level is different from the fourth voltage level.

7. The PD source device of claim 6, wherein:
the logic circuit is an AND gate;
each of the first voltage level and the second voltage level is a high voltage level; and
each of the third voltage level and the fourth voltage level is a low voltage level.

8. The PD source device of claim 1, wherein the output voltage communication circuit further comprises:
an isolation switch, including:
a first end coupled to the active clamp flyback converting circuit for receiving the second pulsed DC voltage;
a second end coupled to the first power supply pin; and
a control end coupled to the fourth pin of the pulse width modulation integrated circuit for receiving the fourth control signal.

9. The PD source device of claim 1, wherein the boost PFC circuit further comprises: a rectifier configured to convert the AC voltage to a DC voltage; a boost inductor, including: a first end coupled to the rectifier for receiving the DC voltage; and a second end coupled to the first end of the first power switch for storing energy of the DC voltage; and the output diode, including: an anode coupled to the second end of the boost inductor; and a cathode coupled to the first output capacitor.

10. The PD source device of claim 1, further coupled to the PD sink device via a USB Type-C interface.

11. A power delivery (PD) system with electrical arc suppression, comprising: a PD source device, comprising: a first power supply pin for supplying power; a first configuration channel pin for receiving a pull-down voltage; a boost power factor correction (PFC) circuit configured to covert an alternative-current (AC) voltage supplied by mains electricity to a first pulsed direct-current (DC) voltage, and comprising: a first output capacitor for storing energy of the first pulsed DC voltage; and a first power switch, comprising: a first end coupled to a first end of the first output capacitor through an output diode; a second end coupled to a second end of the first output capacitor; and a control end for receiving a first control signal; an active clamp flyback converting circuit configured to covert the first pulsed DC voltage to a second pulsed DC voltage, and comprising: a transformer configured to transfer the energy of the first pulsed DC voltage from a primary side to a secondary side for supplying the second pulsed DC voltage, and comprising: a primary winding disposed on the primary side and including a first dotted terminal and a first undotted terminal; a secondary winding disposed on the secondary side and including a second dotted terminal and a second undotted terminal; and a discharge winding for providing a discharge inductor; a clamp voltage capacitor, including: a first end coupled to the boost PFC circuit for receiving the first pulsed DC voltage; and a second end coupled to a first end of the discharge inductor; a second power switch, including: a first end coupled to the first undotted terminal; a second end coupled to a ground level; a control end for receiving a second control signal; an active clamp switch, including: a first end coupled to the first undotted terminal; a second end coupled to the first end of the discharge inductor; and a control end for receiving a third control signal; and a second output capacitor for storing energy of the second pulsed DC voltage and including: a first end coupled to the first power supply pin; and a second end coupled to a ground pin; and an output voltage communication circuit configured to selectively couple a second end of the discharge inductor to the first power supply pin according to a voltage level of the first power supply pin and a voltage level of the first configuration channel pin; and a PD sink device, comprising: a second power supply pin for receiving the power supplied from the first power supply pin of the PD source device; and a second configuration channel pin for outputting the pull-down voltage when the first configuration channel pin of the PD source device is coupled to the second configuration channel pin of the PD sink device.

12. The PD system of claim 11, wherein the output voltage communication circuit is configured to couple the second end of the discharge inductor to the first power supply pin when the voltage level of the first power supply pin is higher than a reference voltage and a value of the pull-down voltage is not within a predetermined range, thereby discharging the energy stored in the second output capacitor to the ground level sequentially via the discharge inductor, the clamp voltage capacitor and the first output capacitor.

13. The PD system of claim 11, wherein the active clamp flyback converting circuit further comprises:
a leakage inductor, including:
a first end coupled to the first end of the clamp voltage capacitor; and a second end coupled to the first dotted terminal; and
a magnetizing inductor, including:
   a first end coupled to the first dotted terminal; and
   a second end coupled to the first undotted terminal.

14. The PD system of claim 11, wherein:
the active clamp flyback converting circuit further comprises an output diode which includes:
   an anode coupled to the second undotted terminal of the secondary winding in the transformer; and
   a cathode; and
the second output capacitor includes:
   a first end coupled to the cathode of the output diode; and
   a second end coupled to the second dotted terminal of the secondary winding in the transformer.

15. The PD system of claim 11, wherein the output voltage communication circuit comprises:
a pulse width modulation integrated circuit, including:
   a first pin for outputting the first control signal;
   a second pin for outputting the second control signal;
   a third pin for outputting the third control signal;
   a fourth pin for outputting a fourth control signal;
   a fifth pin for outputting a fifth control signal;
   a sixth pin for receiving a discharge control signal; and
   a seventh pin for receiving a reference voltage;
a comparator, including:
   a positive input end coupled to the first power supply pin;
   a negative input end coupled to the seventh pin of the pulse width modulation integrated circuit for receiving the reference voltage; and
   an output end for outputting a comparison signal;
a PD integrated circuit, including:
   an input end coupled to the first configuration channel pin; and
   an output end for outputting a connection signal;
a logic circuit, including:
   a first input end coupled to the output end of the comparator for receiving the comparison signal;
   a second input end coupled to the output end of the PD integrated circuit for receiving the connection signal; and
   an output end for outputting the discharge control signal to the sixth pin of the pulse width modulation integrated circuit; and
a discharge switch, including:
   a first end coupled to the second end of the discharge inductor;
   a second end coupled to the first power supply pin; and
   a control end coupled to the fifth pin of the pulse width modulation integrated circuit for receiving the fifth control signal.

16. The PD system of claim 15, wherein:
the comparator is configured to output the comparison signal having a first voltage level when the voltage level of the first power supply pin is higher than the reference voltage;
the comparator is configured to output the comparison signal having a second voltage level when the voltage level of the first configuration channel pin is not higher than the reference voltage;
the PD integrated circuit is configured to output the connection signal having a third voltage level when a value of the pull-down voltage received from the first configuration channel pin is not within a predetermined range;
the PD integrated circuit is configured to output the connection signal having a fourth voltage level when the value of the pull-down voltage received from the first configuration channel pin is within the predetermined range;
the logic circuit is configured to output the discharge control signal having a fifth voltage level when the first input end of the logic circuit receives the comparison signal having the first voltage level and the second input end of the logic circuit receives the connection signal having the third voltage level;
the pulse width modulation integrated circuit is configured to output the fifth control signal having an enable level for turning on the discharge switch when the sixth pin of the pulse width modulation integrated circuit receives the discharge control signal having the fifth voltage level;
the first voltage level is different from the second voltage level; and
the third voltage level is different from the fourth voltage level.

17. The PD system of claim 16, wherein:
the logic circuit is an AND gate;
each of the first voltage level and the second voltage level is a high voltage level; and
each of the third voltage level and the fourth voltage level is a low voltage level.

18. The PD system of claim 11, wherein the output voltage communication circuit further comprises:
an isolation switch, including:
   a first end coupled to the active clamp flyback converting circuit for receiving the second pulsed DC voltage;
   a second end coupled to the first power supply pin; and
   a control end coupled to the fourth pin of the pulse width modulation integrated circuit for receiving the fourth control signal.

19. The PD system of claim 11, wherein the boost PFC circuit further comprises: a rectifier configured to convert the AC voltage to a DC voltage; a boost inductor, including: a first end coupled to the rectifier for receiving the DC voltage; and a second end coupled to the first end of the first power switch for storing energy of the DC voltage; and the output diode, including: an anode coupled to the second end of the boost inductor; and
a cathode coupled to the first output capacitor.

20. The PD system of claim 11, wherein the PD source device is coupled to the PD sink device via a USB Type-C interface.

* * * * *